Aug. 7, 1928.  1,679,636
H. E. STONEBRAKER
METHOD AND MECHANISM FOR PRODUCING GEARS
Filed May 8, 1925
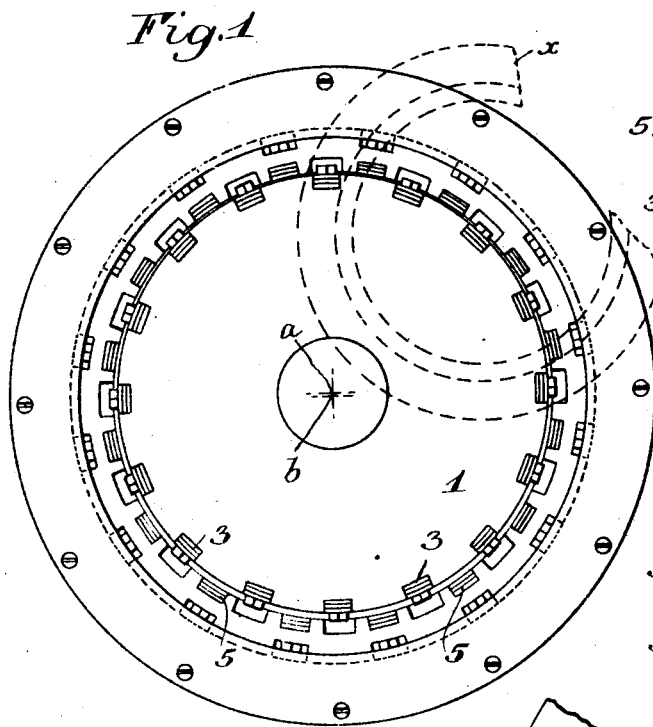
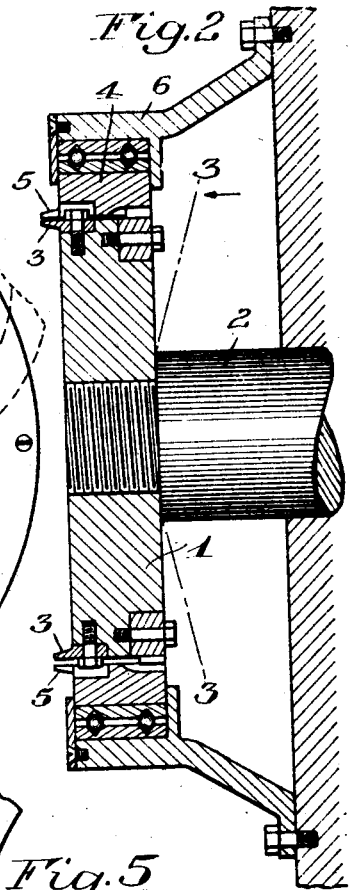
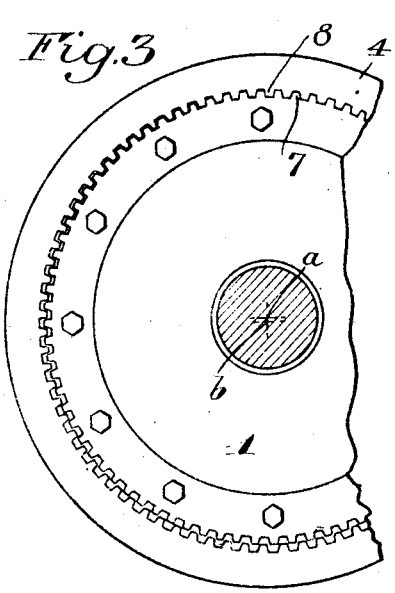
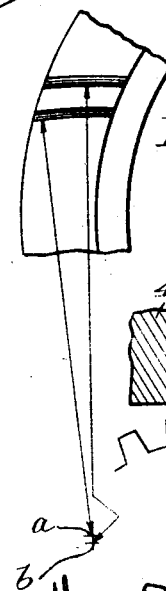
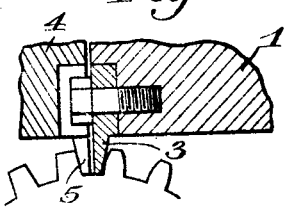
Inventor
Harold E. Stonebraker Patented Aug. 7, 1928.

1,679,636

UNITED STATES PATENT OFFICE.

HAROLD E. STONEBRAKER, OF ROCHESTER, NEW YORK, ASSIGNOR TO GLEASON WORKS, OF ROCHESTER, NEW YORK, A CORPORATION OF NEW YORK.

METHOD AND MECHANISM FOR PRODUCING GEARS.

Application filed May 8, 1925. Serial No. 28,849.

My invention relates to a method and mechanism for producing gears having lengthwise curved teeth, and has for its primary object to make it possible to cut gear teeth two faces at a time instead of a single face at a time, as is now generally practiced.

A further object of the invention is to enable cutting both a gear and pinion by a simultaneous operation on two faces, thus greatly increasing the speed of production and correspondingly reducing the cost of gear cutting.

Another object is to bring about such an increased cutting speed without lessening the accuracy or efficiency of the gears produced.

Still a further purpose of the invention is to afford a method and mechanism for producing curved tooth gears so that the mating faces of a gear and pinion will be formed on curves that insure a smooth, gradual engagement with a minimum of backlash, resulting in extremely quiet running gears.

An additional purpose is to afford a method and mechanism for producing curved tooth gears such that any one of a group of gears can be indiscriminately matched with any one of a group of pinions, thus greatly reducing the present day cost of gear production due to the practice of matching, in pairs, gears having compensating or conjugate errors, or refinishing the gears having excessive errors.

With these ends in view, the invention embraces the process and mechanism that will appear clearly from the following description, when read in conjunction with the accompanying drawing, the novel features being pointed out in the claims following the specification.

In the drawing:

Figure 1 is a view in side elevation showing a cutter mechanism constructed according to one embodiment of the invention, with one possible position of a gear blank indicated in dotted lines;

Figure 2 is a sectional view of the cutter mechanism;

Figure 3 is a sectional view on line 3—3 of Figure 2;

Figure 4 is an enlarged detail sectional view showing the position of inner and outer tools in a tooth space of a blank, and Figure 5 is a diagrammatic view of a portion of a blank, illustrating a groove or space and the centers about which the adjacent faces are formed.

The invention is applicable to the cutting of either spur, bevel, or herringbone type gears, and may likewise be applied either to a roughing-out process or to a finishing or generating process, in which latter there is a relative rolling motion between a tool and gear blank during cutting movement of the tool. The method and cutter mechanism herein disclosed can be readily applied to various conventional types of gear cutting and generating machines, and is particularly adaptable to gear cutting machinery of the general type employing a rotary annular face mill cutter, and such as illustrated in Patents No. 1,325,784, December 23, 1919, and No. 1,203,608, November 7, 1916.

In general, the invention consists in forming two adjacent faces on a gear so as to conform to two eccentrically related circles having radii of slightly different lengths, and this may be conveniently carried out in the mechanism shown, which includes an inner cutter head 1 mounted on the spindle 2 and carrying an inner set of tools 3, preferably arranged circularly. 4 is an outer cutter head surrounding the inner cutter head and carrying the outer set of tools 5, preferably arranged circularly.

The two cutter heads may be arranged and driven in a variety of ways, this being simply a matter of mechanical design, and as an exemplary practical arrangement, I have shown the outer cutter head 4 turning within a fixed bearing 6, and operated from the inner cutter head 1 through the instrumentality of gear teeth 7 carried by the inner cutter head and engaging gear teeth 8 carried by the outer cutter head.

The inner cutter head 1 rotates about the center $a$, while the outer cutter head 4 rotates about the center $b$, said centers being slightly spaced from each other, as shown in Figures 1 and 5. Cutter head 1 is arranged within cutter head 4, so that the two sets of tools move in curved paths on arcs of eccentric circles having radii of slightly different lengths.

A bevel gear blank is shown in operative relation to the cutter mechanism at $x$ in Figure 1. The bevel gear blank is shown arranged at the upper side of the cutter mechanism where the circles in which the two sets of tools travel are closest together. By positioning the blank with reference to the cutter mechanism so that the two sets of tools cut closest together at one side of the gear face and farthest apart at the opposite side of the gear face, tapering or converging grooves and teeth are produced. This is advantageous in the case of bevel gears where either the teeth or grooves must taper, and where the best results are had by tapering both the teeth and grooves. In the case of spur gears, or where it is desirable to cut widest at the center and narrower at the sides of the gear face, the blank may be arranged at the bottom of the cutter mechanism with reference to Figure 1, so that the circles in which the tools travel are farthest apart at the center of the gear face, and converge toward the sides, thus affording a symmetrical convergence from the center toward the sides of the gear face. It is obviously within the province of the invention to position the gear blank, or the portion of the blank being cut, at any desired point with reference to the circular paths of the two sets of tools, depending upon the amount of convergence or form of groove or tooth that is desired between the two faces being cut.

In the illustrated arrangement, the outer tools 5 travelling about center $b$ form the concave face of the groove shown in Figure 5, and the inner tools 3 travelling about center $a$ form the convex face of the groove. If the inner and outer sets of tools engage opposite sides of a tooth instead of a space or groove, the inner tools 3 would form the concave side of a tooth and the outer tools 5 would form the convex side of the tooth. The same cutter mechanism can be used to cut both a gear and pinion of a pair, in which event the concave faces on the pinion will contact with or mate with the convex faces on the gear and vice versa. Thus the mating or contacting faces of the two members of a pair correspond to the two faces shown in Figure 5, and conform to circles on slightly different radii and about different centers.

Where the term "cutting" or "cutter" is used throughout this specification and claims, it is to be understood as comprehending also a grinding or abrading method or mechanism as well as the specific system or apparatus shown herein. The invention may be carried out with other arrangements and mechanism than that disclosed, and this application is intended to cover any modifications or departures embodying the principles set forth or coming within the scope of the following claims. The application of the cutter mechanism described herein to any known or conventional gear cutting or generating machinery is easily within the skill of those mechanically versed in the art of gear manufacture.

I claim:

1. The method of producing curved tooth cylindrical and tapered gears consisting in simultaneously forming two adjacent faces by rotating independent cutters about different centers so as to move their tools in conformity to two eccentrically related circles.

2. The method of producing curved tooth cylindrical and tapered gears consisting in forming two adjacent faces by simultaneously moving two tools about different centers in curved paths disposed one within the other.

3. A gear cutter mechanism for producing cylindrical and tapered gears comprising a plurality of independently supported tools movable in curved paths across the face of a gear blank in cutting relation with adjacent tooth faces, and means for simultaneously imparting movement to said tools.

4. The method of producing curved tooth cylindrical and tapered gears, consisting in simultaneously cutting two adjacent space-forming faces by moving two sets of tools through a single tooth space in circular paths which are eccentrically related and have radii of different lengths.

5. A gear cutter mechanism for producing cylindrical and tapered gears comprising a plurality of independently supported tools which are so related as to be movable simultaneously in curved paths across the face of a gear blank through a single tooth space and in cutting relation with the adjacent bounding faces of such tooth space, and means for imparting simultaneous movement to said tools.

6. A gear cutter mechanism for producing cylindrical and conical gears comprising two cutter heads carrying sets of tools adapted to travel in eccentric circles located one within the other, means for rotating one of said cutter heads, and a direct gear connection between the two cutter heads.

7. The method of producing curved tooth cylindrical and conical gears consisting in simultaneously cutting two adjacent tooth faces by moving two tools about different centers in separate curved paths across the face of a gear blank.

8. A mechanism for cutting cylindrical and tapered gears comprising two cutter heads carrying sets of tools adapted to travel in eccentric circles located one within the other and to cut adjacent space bounding faces simultaneously, the tools on one cutter head being located between adjacent tools on the other cutter head, and means for simultaneously imparting movement to the cutter heads.

9. The method of producing curved tooth cylindrical and tapered gears, consisting in simultaneously cutting two adjacent space-forming faces by moving two sets of tools through a single tooth space in circular paths which are eccentrically related and have radii of different lengths.

10. A gear cutter mechanism for producing cylindrical and tapered gears comprising a plurality of series of tools movable in curved paths about different centers across the face of a gear blank in cutting relation with the space-forming faces of a single tooth space, and means for simultaneously imparting movement to said tools.

In witness whereof, I have hereunto signed my name.

HAROLD E. STONEBRAKER.